United States Patent [19]
Schmitt, Sr.

[11] 3,945,143
[45] Mar. 23, 1976

[54] FISHING POLE HOLDER
[76] Inventor: Anthony S. Schmitt, Sr., 4125 Springdale, St. Louis, Mo. 63134
[22] Filed: Feb. 14, 1975
[21] Appl. No.: 549,906

[52] U.S. Cl. .................................. 43/17; 43/21.2
[51] Int. Cl.² .......................................... A01K 97/12
[58] Field of Search ................... 43/17, 16, 21.2, 15

[56] References Cited
UNITED STATES PATENTS
| | | | |
|---|---|---|---|
| 3,058,251 | 10/1962 | Brooks | 43/17 |
| 3,285,360 | 11/1966 | Wetsch | 43/17 |
| 3,618,068 | 11/1971 | Sloan | 43/17 |

Primary Examiner—Warner H. Camp
Attorney, Agent, or Firm—Harvey A. Gilbert

[57] ABSTRACT

This device consists primarily of a frame insertable into the ground or mountable on any supporting structure such as the side of a boat or wharf, and having an adjustable cradle fastened thereon for holding a fishing pole and the device includes spring and adjustable fastener means for applying the proper tension for the cradle contact with a push button switch which activates a horn and a light.

2 Claims, 2 Drawing Figures

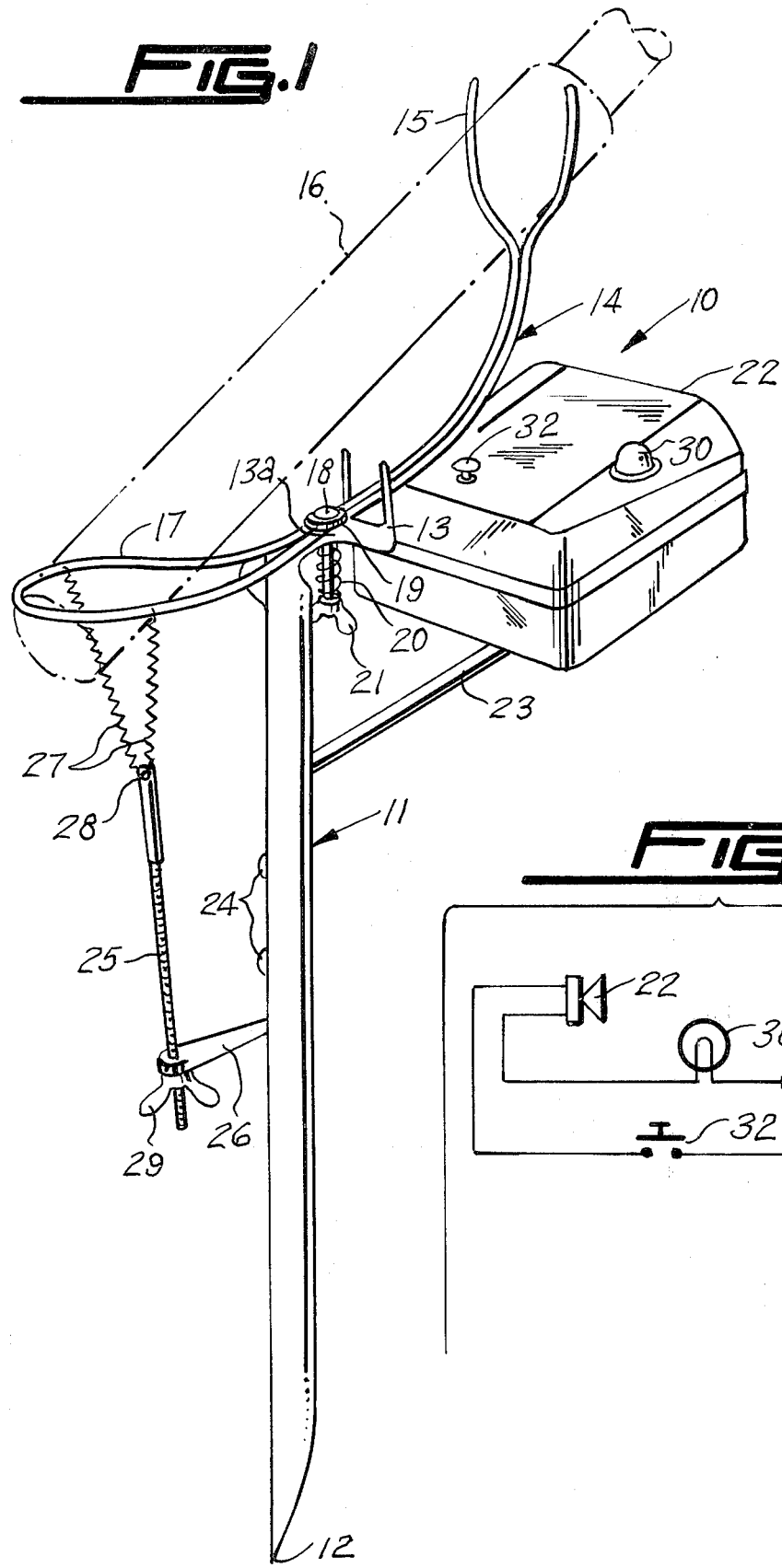

FISHING POLE HOLDER

BACKGROUND OF THE INVENTION

This invention relates to fishing tackle, and more particularly to a fishing pole holder for use at night and in the day time.

It is therefore the principal object of this invention to provide a fishing pole holder which will alert a fisherman when a fish strikes the fish hook on the line of the fishing pole.

Another object of this invention is to provide a fishing pole holder which when a fish strikes, the cradle of the device, will rock forward and urge down the push button switch which will activate a horn and a light simultaneously.

Another object of this invention is to provide a pole holder of the type described, which will have adjustment means for varying the tension between the cradle which holds the pole, and the frame.

Other objects of the invention are to provide a fishing pole holder which is simple in design, inexpensive to manufacture, rugged in construction, easy to use and efficient in operation.

These and other objects will readily be evident upon study of the following specification and the accompanying drawing, wherein:

BRIEF DESCRIPTION OF THE DRAWING

FIG. 1 is a perspective view of the present invention showing the butt of a fishing rod in phantom lines.

FIG. 2 is a schematic wiring diagram of the invention.

DESCRIPTION OF THE PREFERRED EMBODIMENT

According to this invention, the fishing pole holder 10 is shown to include a frame 11 having a pointed end 12 and a U-shaped end 13 on the arcuate portion 13A. An arcuately shaped cradle 14 of holder 10 is provided with an open yoke 15 which receives the forward end of pole 16 and the rear end of pole 16 is received within the eye means 17 of cradle 14. A bolt fastener 18 receives a washer 19 and communicates through the arcuate portion of cradle 14 and arcuate portion 13A of frame 11. Coiled spring 20 and wing nut fastener 21 are received upon bolt fastener 18 to provide adjustment tension means between cradle 14 and arcuate portion 13A of frame 11. A horn 22 is secured fixedly in a suitable manner, to rod 23 which is secured fixedly to frame 11 by means of fasteners 24. A threaded bolt fastener 25 is threadably received within portion 26 of rod 23 and a pair of springs 27 are received at one end, within the eye portion 28 of bolt 25, the opposite ends of the springs 27 being secured on each of the sides of eye 17 of cradle 14. The springs 27 providing means of adjusting the pole holder 10 due to the various weights and sizes of fishing poles.

It shall be noted that the adjustment is such, that the cradle 14 must be a quarter of an inch above the push button switch 32 of horn 22.

Horn 22 is wired in series with battery 31, push button switch 32 and light 30.

In use, when a fish strikes the hook on the line of the pole 16, the cradle 14 is rocked forwardly because the end of the pole 16 is abutting the eye means 17 and thus, the forward portion of cradle 14 strikes the push button 32 and closes the circuit to the horn 22 and the light 30.

What I now claim is:

1. A fishing pole holder comprising, in combination, a frame for support and a cradle for holding a pole mounted rockably on said frame, wherein said frame is pointed at one end for insertion into the ground and the opposite end is arcuate and includes a U-shaped portion in which said cradle freely rides, said arcuate portion of said frame being secured pivotably to said cradle which is arcurate in configuration for said rocking movement there-between.

2. A fishing pole holder comprising, in combination, a frame having one end arcuate and including a U-shaped portion, a cradle rockably mounted on the arcuate end of said frame to ride freely in said U-shaped portion, and a pushbutton actuated horn and light mounted on said frame in close proximity to said cradle, wherein said cradle includes an open yoke portion in which the front end of the butt of said pole is removably received, and the opposite end of said cradle is provided with eye means in which the rear portion of the butt of said pole is removably retained and bolt fastener and washer means secure said cradle to the arcuate portion of said frame adjacent to the U-shaped portion and said bolt fastener receives spring means and wing nut means to provide adjustment means for the arcuate pivoting of said cradle against said push button switch of said horn and light.

* * * * *